(12) United States Patent
Linch et al.

(10) Patent No.: US 9,849,968 B2
(45) Date of Patent: Dec. 26, 2017

(54) PROPELLER

(71) Applicants: Jonathon J. Linch, Los Angeles, CA (US); Kyle M. Rahrig, El Segundo, CA (US)

(72) Inventors: Jonathon J. Linch, Los Angeles, CA (US); Kyle M. Rahrig, El Segundo, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 533 days.

(21) Appl. No.: 14/560,964

(22) Filed: Dec. 4, 2014

(65) Prior Publication Data

US 2016/0159458 A1  Jun. 9, 2016

(51) Int. Cl.

| | | |
|---|---|---|
| *B64C 11/00* | (2006.01) | |
| *B64C 11/08* | (2006.01) | |
| *B64C 11/18* | (2006.01) | |
| *B64C 39/02* | (2006.01) | |
| *B64C 39/10* | (2006.01) | |

(52) U.S. Cl.
CPC ............ *B64C 11/001* (2013.01); *B64C 11/08* (2013.01); *B64C 11/18* (2013.01); *B64C 39/024* (2013.01); *B64C 39/10* (2013.01); *B64C 2039/105* (2013.01); *B64C 2201/028* (2013.01); *B64C 2201/162* (2013.01); *B64C 2220/00* (2013.01); *Y02T 50/12* (2013.01)

(58) Field of Classification Search
CPC ....... B64C 11/001; B64C 11/08; B64C 11/11; B64C 39/10; B64C 39/024; B64C 29/00
See application file for complete search history.

(56) References Cited

U.S. PATENT DOCUMENTS

| | | | |
|---|---|---|---|
| 2,091,677 A | 1/1936 | Fredericks | |
| 4,691,973 A | 9/1987 | Rosheim | |
| 5,096,382 A | 3/1992 | Gratzer | |
| 5,810,288 A * | 9/1998 | Sager | B63H 1/14 244/65 |

(Continued)

FOREIGN PATENT DOCUMENTS

| | | |
|---|---|---|
| DE | 102011117542 A1 | 5/2013 |
| FR | 2897039 A1 | 8/2007 |

(Continued)

OTHER PUBLICATIONS

International Search Report for Application No. PCT/US2015/060197 dated Mar. 14, 2016.

*Primary Examiner* — Woody Lee, Jr.
*Assistant Examiner* — Maxime Adjagbe
(74) *Attorney, Agent, or Firm* — Tarolli, Sundheim, Covell & Tummino LLP

(57) ABSTRACT

A propeller includes a hub coaxially surrounding a longitudinal axis. A ring shroud coaxially surrounds the longitudinal axis and is spaced radially from the hub. At least one propeller blade is fixedly attached to both the hub and ring shroud and extends radially therebetween for mutual rotation therewith. At least one stub blade has a first stub end radially spaced from a second stub end. The first stub end is fixedly attached to a selected one of the hub and ring shroud. The second stub end is cantilevered from the first stub end and is radially interposed between the first stub end and the selected one of the hub and ring shroud.

6 Claims, 3 Drawing Sheets

(56) References Cited

U.S. PATENT DOCUMENTS

| | | | | |
|---|---|---|---|---|
| 7,472,863 B2* | 1/2009 | Pak | ............... | A63H 27/14 |
| | | | | 244/12.5 |
| 2012/0213636 A1* | 8/2012 | Gallant | ............. | F03D 1/0625 |
| | | | | 416/182 |

FOREIGN PATENT DOCUMENTS

| WO | WO 2006/002464 A1 | 1/2006 |
|---|---|---|
| WO | WO 2014/026993 A1 | 2/2014 |

\* cited by examiner

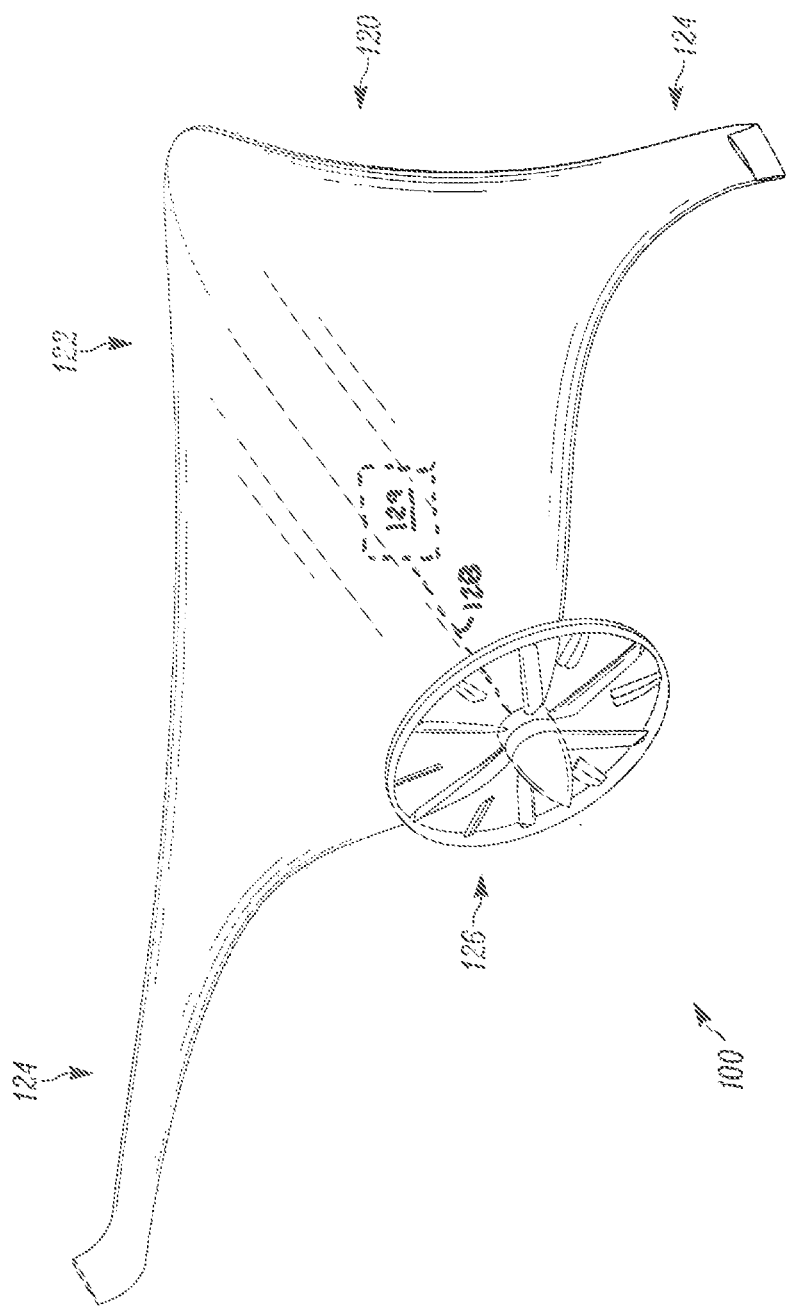

PROPELLER

TECHNICAL FIELD

This disclosure relates to an apparatus and method for use of a propeller and, more particularly, to a ring propeller for attenuating volume dependent thickness noise amplitude.

BACKGROUND

Many manned and unmanned ("UAVs") aircraft driven by propeller are susceptible to ground threats such as small arms fire and manned-portable air defense systems ("MANPADS"). Given the nature of typical missions and operations, it may be desirable to reduce audible detectability. The ability to cancel or substantially reduce critical tones of a propeller system's acoustic signature may be important in reducing these vehicles' acoustic signatures and enhancing mission effectiveness. Small UAVs typically use fixed pitch propellers which are neither subject to the complexities nor the stresses of variable pitch propellers which are used for manned vehicles or large UAVs. Hence, innovative propeller concepts which are subject to structural constraints may be better implemented on these less-complex systems, compared to manned vehicles or large UAVs.

SUMMARY

In an embodiment, a propeller is described. A hub coaxially surrounds a longitudinal axis. A ring shroud coaxially surrounds the longitudinal axis and is spaced radially from the hub. At least one propeller blade is fixedly attached to both the hub and ring shroud and extends radially therebetween for mutual rotation therewith. At least one stub blade has a first stub end radially spaced from a second stub end. The first stub end is fixedly attached to a selected one of the hub and ring shroud. The second stub end is cantilevered from the first stub end and is radially interposed between the first stub end and the selected one of the hub and ring shroud.

In an embodiment, a propeller is described. A hub coaxially surrounds a longitudinal axis. A ring shroud coaxially surrounds the longitudinal axis and is spaced radially from the hub. A plurality of motive blades extends radially across at least a portion of the distance between the hub and the ring shroud. Each motive blade has a blade root directly attached to a chosen one of the hub and the ring shroud, for rotation about the longitudinal axis due to the attachment to the chosen one of the hub and the ring shroud, and a blade tip extending toward the other one of the hub and the ring shroud. At least one selected blade tip is directly attached to the other one of the hub and the ring shroud. At least one other blade tip is cantilevered from the blade root and is radially spaced apart from the other one of the hub and the ring shroud.

In an embodiment, an aircraft is described. The aircraft includes a body, at least one fixed wing and at least one propeller mount extending from the body, and at least one drive shaft positioned within a corresponding at least one propeller mount and drivable by a motor or gear/clutch system. At least one propeller is operationally attached to the at least one drive shaft to obtain motive power therefrom. The propeller includes a hub coaxially surrounding a longitudinal axis. A ring shroud coaxially surrounds the longitudinal axis and is spaced radially from the hub. A plurality of motive blades extends radially across at least a portion of the distance between the hub and the ring shroud. Each motive blade has a blade root directly attached to a chosen one of the hub and the ring shroud, for rotation about the longitudinal axis, under motive power from the drive shaft, due to the attachment to the chosen one of the hub and the ring shroud, and a blade tip extending toward the other one of the hub and the ring shroud. At least one selected blade tip is directly attached to the other one of the hub and the ring shroud. At least one other blade tip is cantilevered from the blade root and is radially spaced apart from the other one of the hub and the ring shroud.

BRIEF DESCRIPTION OF THE DRAWINGS

For a better understanding, reference may be made to the accompanying drawings, in which:

FIG. 3 depicts the embodiment of FIG. 1 in an example use environment.

DESCRIPTION OF ASPECTS OF THE DISCLOSURE

The invention comprises, consists of, or consists essentially of the following features, in any combination.

The Figures depict an example of a High Attenuation, Low Observable ("HALO") ring propeller for delaying the onset of aural detection by a human observer. Propulsion mechanisms are generally the primary offending source mechanism for all modern day aircraft, with the exception of some ultralights and alternative energy designs. Other contributing sources include, but are not limited to, airframe, exhaust, and fan noise. Propellers are among the greatest acoustic challenges in developing propulsion noise reduction technologies for attenuating volume dependent thickness noise amplitude. The HALO propeller system responds to this challenge by utilizing an inverted blade, segmented annulus design with incremental spacing to attenuate noise via increased blade passage frequency, and distributed blade loading. This design may assist with both high solidity and asymmetric spacing for temporal phase mismatching. The annulus minimizes thickness noise by reducing transverse forces across the blades. An "in-unison" rotation may help to enhance aerodynamic performance and propulsive efficiency by reducing vortex shedding at low tip speeds produced by the inverted blades. In many cases, high efficiency has positive correlation to low noise. Potential aerodynamic benefits indicate HALO to be a viable noise reduction technology.

Figure 1:
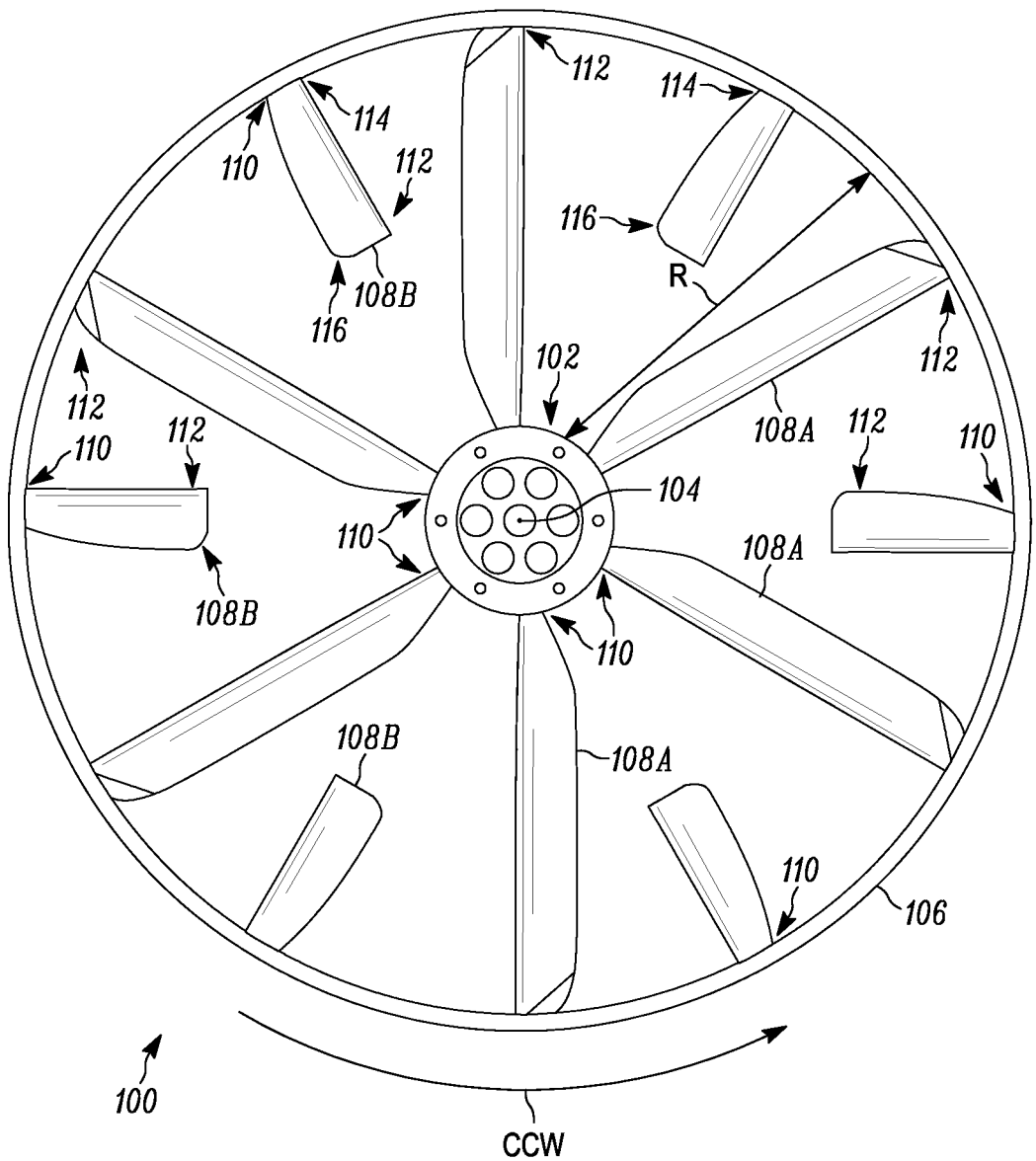
FIG. 1 is a schematic front view of one embodiment.

FIG. 1 depicts an example propeller 100 which uses a ducted HALO concept with incremental blade spacing to increase blade passage frequency and reduce blade loading. The propeller includes a hub 102 coaxially surrounding a longitudinal axis 104 (seen end-on in FIG. 1). The term "coaxial" is used herein to indicate that the objects described as such have coincident axes (here, both the hub 102 and the propeller 100 share the longitudinal axis 104).

A ring shroud 106 coaxially surrounds the longitudinal axis 104 and is spaced radially from the hub 102. A "radial" direction, as used here, is a direction toward and away from the longitudinal axis 104, in the plane of the page of FIG. 1. A plurality of motive blades 108, of any mix of types as will be described below, each extend radially across at least a portion of the distance R between the hub 102 and the ring shroud 106. Each motive blade 108 has a blade root 110 attached (e.g., directly attached) to a chosen one of the hub 102 and the ring shroud 106, for rotation of that motive blade 108 about the longitudinal axis 104 due to such attachment. Each motive blade 108 also has a blade tip 112 extending radially away from the blade root 110, toward the other one (i.e., the one to which the blade root 110 is not directly attached) of the hub 102 and the ring shroud 106.

As can be seen in FIG. 1, certain of the motive blades 108 are propeller blades 108A, having both the blade root 110 and the blade tip 112 for that propeller blade 108A directly attached to respective ones of the hub 102 and the ring shroud 106, with the body of the propeller blade spanning the distance R. (It should be noted that the identification of a particular end of a motive blade 108 as a blade root 110 or blade tip 112 is done herein for orientation purposes only, and no indication or significance of a particular structural feature is implied or intended by this orienting terminology.)

Other ones of the motive blades 108 are stub blades 108B, having the blade root 110 directly attached to a chosen one of the hub 102 and the ring shroud 106 (the blade roots 110 of the stub blades 108B are shown here as being attached to the ring shroud 106, but could be instead attached to the hub 102 by one of ordinary skill in the art, as desired for a particular use environment). In contrast to the propeller blades 108A, however, stub blades 108B each have a blade tip 112 that is cantilevered from the blade root 110 and is radially spaced apart from the other one of the hub 102 and the ring shroud 106 (here, the stub blade 108B blade tips 112 are radially spaced from the hub 102). The term "cantilevered" is used herein to indicate a projecting beam or other horizontal member supported at one or more points (e.g., the blade root 110) but not at both ends.

In other words, the stub blades 108B are each directly attached to a chosen one of the hub 102 and the ring shroud 106 but only span a portion of the distance R to the other one of the hub 102 and the ring shroud 106. Stated differently, at least one stub blade 108B may have a first stub end 114 radially spaced from a second stub end 116, the first stub end 114 being fixedly attached to a selected one of the hub 102 and ring shroud 106. The second stub end 116 is then cantilevered from the first stub end 114 and is radially interposed between the first stub end 114 and the selected one of the hub 102 and ring shroud 106.

At least one propeller blade 108A is fixedly attached to both the hub 102 and the ring shroud 106 and extends radially therebetween for mutual rotation therewith. That is, the hub 102, propeller blades 108A (four shown in FIG. 1), and ring shroud 106 are attached together and rotate about the longitudinal axis 104 as a unit, under motive force. Generally, the motive force will be provided to the hub 102 via a drive shaft (not shown) extending along the longitudinal axis 104, but it is contemplated that other drive means, of any desired type, may exert motive force upon any structure (e.g., the ring shroud 106) of the described propeller 100.

The motive blades 108 of the propeller 100 may be arranged in any desired circumferential sequence(s) or grouping(s) about a perimeter 118 of the hub 102. For example, the propeller blades 108A shown in FIG. 1 are circumferentially spaced about the perimeter 118 of the hub 102. The term "circumferentially" is used herein to indicate a circular direction which is centered on the longitudinal axis 104, such as the counterclockwise direction indicated by arrow CCW in FIG. 1. Each circumferentially adjacent pair of propeller blades 108A in FIG. 1 is shown as having at least one stub blade 108B interposed circumferentially therebetween, though such is not required. Optionally, two or more stub blades 108B could be interposed circumferentially between a circumferentially adjacent pair of propeller blades 108A, or vice versa.

The arrangement of propeller blades 108A and stub blades 108B may be optionally, though not necessarily, done in a rotationally symmetrical manner. That is, the propeller 100 is "rotationally symmetrical" if it can be rotated less than 360° around the longitudinal axis 104 and still match its appearance before the rotation occurred. Other, nonlimiting options for potentially rotationally symmetrical arrangements include a pair of circumferentially adjacent propeller blades 108A with no circumferentially interposed stub blades 108B, a pair of circumferentially adjacent propeller blades 108A with three or more circumferentially interposed stub blades 108B, and a pair of circumferentially adjacent propeller blades 108A with one circumferentially interposed stub blade 108B. If the arrangement of propeller blades 108A and stub blades 108B is done in a rotationally asymmetrical manner, it may be desirable to balance the system for better temporal phase matching of thickness and loading noise sources, such as by locating lighter and/or smaller blades in areas of more concentrated spacing.

Figure 2:
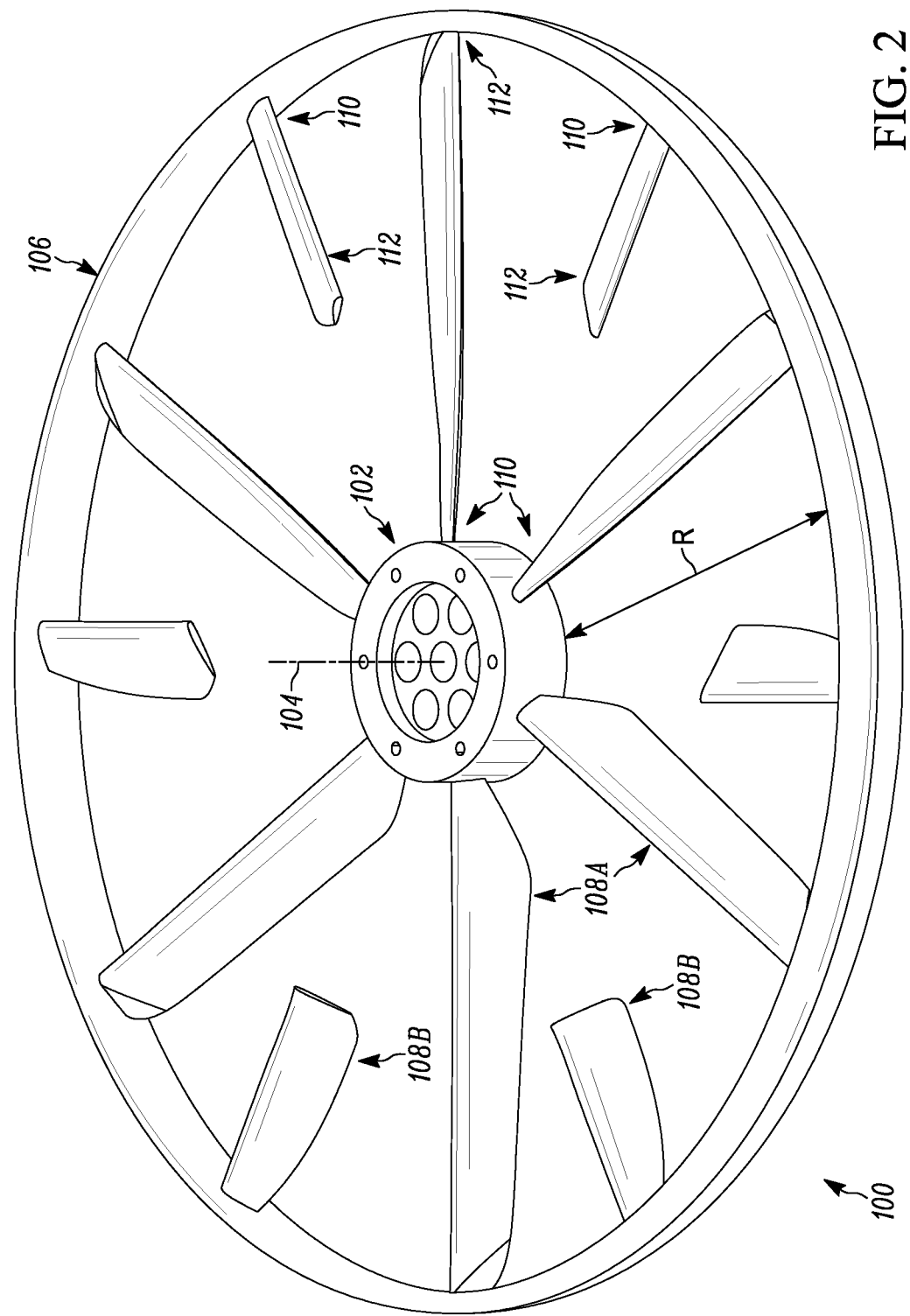
FIG. 2 is a perspective view of the embodiment of FIG. 1.

As is known to one of ordinary skill in the propeller arts, one or more of the motive blades 108 may be angled in a selected "twist direction", as can be seen in the perspective view of FIG. 2. The cross-sectional shape of the motive blade 108 changes over the length of the motive blade 108, resulting in a twist, as shown. Optionally, the blade root 110 and/or blade tip 112 of a single blade 108 may be attached to a respective hub 102 or ring shroud 106 at an angle to aid with creating, maintaining, and/or carrying out a particular twist configuration. The twist helps the propeller 100 produce thrust, and a twist design considers factors including lift, relative speed of the motive blade 108 at various points along its radial length (e.g., along distance R), angle of attack, the weight of the aircraft, the speed of the propeller 100 (RPM), the power of the engine, and the final thrust required to maintain flight.

Optionally, selected motive blades 108 of the propeller 100 could be angled in the same or different twist directions from other motive blades 108 of the same propeller. For example, some or all of the propeller blades 108A could be angled in a first twist direction, while some or all of the stub blades 108B could be angled in a second twist direction which is substantially opposite the first twist direction. As another example, it is generally contemplated that at least one motive blade 108 (of any type) angled in the first twist direction may be directly circumferentially adjacent to at least one motive blade 108 (of any type, whether or not the same type as the first motive blade in this example) angled in the second twist direction. The twist direction(s) for a particular propeller 100 may be chosen and assigned as desired to various one(s) of the motive blades 108 (e.g., the propeller blades 108A and/or stub blades 108B) by one of ordinary skill in the art based on any desired factors, such as, but not limited to, achieving particular vortex properties during use of the propeller 100 and controlling tip speeds of the propeller blades 108A and/or stub blades 108B toward the hub 102.

In one example configuration, the stub blades 108B could be at a minimum twist angle at the ring shroud 106 and approach a maximum twist angle at the end of the stub blade 108B located radially nearest the hub 102, while the propeller blades 108A could simultaneously exhibit the inverse variation, having a relatively steep pitch at the hub 102 and achieving a shallower twist angle as the propeller blades 108A extend towards the ring shroud 106.

The propeller 100 shown in FIG. 1 can be used for attenuating volume dependent thickness noise amplitude, particularly for small UAVs, over that which is currently available. A propeller 100, such as that depicted, is rotated in a first direction at a first rotational speed such as, for example, by motive power supplied by a drive shaft (not shown) extending along the longitudinal axis 104 and operatively connected to the hub 102. In other words, the hub 102, ring shroud 106, and motive blades 108 (including any propeller blade(s) 108A and stub blade(s) 108B provided to the propeller 100) are rotated in the first rotational direction at the first rotational speed. The propeller 100 should be configured to provide a blade passage frequency configured to absorb into an atmosphere surrounding the propeller 100, to substantially reduce audible detection range from an art-recognized value (e.g., a value currently achieved by commercially available small UAVs and/or toward a mission, immersed-background, and altitude-dependent parameter).

Enhanced aerodynamic performance and propulsive efficiency may be attained by minimizing the vortex shedding from the stub blades 108A via decreased tip speeds. The increase in blade passage frequency will reduce detection by taking advantage of atmospheric absorption. The propeller 100 uses inverted blades, such as the stub blades 108B, to take advantage of increased frequencies generated by high solidity. The inverted, or stub, blades also serve to reduce vortices, thus reducing drag due to thrust via decreased tip speeds. Moreover, the ring shroud 106 is used at least partially to increase circumferential spacing for the addition of inverted/stub blades to reduce loading noise while also reducing thickness noise via mitigating transverse forces across the blades.

It is contemplated that a propeller 100, such as that shown in FIG. 1, may remain a relevant technology in the event aeroacoustic performance is substantially enhanced at the expense of aerodynamic operating efficiencies.

FIG. 3 depicts an example use environment for the propeller 100. An aircraft 120 is shown in FIG. 3 as a small UAV, but suitable use environments for the propeller 100 include, as nonlimiting examples, fixed-wing aircraft, helicopters or other rotor-driven aircraft, small UAVs, large UAVs, jet turbines, gas turbines, hydroelectric turbines, or any other described use environments. Any number of propellers 100 can be provided to an aircraft 120, as desired, though a single propeller is shown in the Figures. The propeller(s) 100 could be in any suitable position or physical relationship to the other structures making up the aircraft 120. The aircraft 120 shown in FIG. 3 includes a body 122, at least one fixed wing 124 (two shown), and at least one propeller mount 126 (one shown) extending from the body 122. At least one drive shaft indicated schematically at 128) is positioned within a corresponding at least one propeller mount 126 and is drivable by a motor or gear/clutch system (indicated schematically at 129) to provide a source of rotationally oriented motive power. The propeller 100 is operationally attached to the drive shaft 128, optionally indirectly such as via a gearbox (not shown), to obtain motive power therefrom.

The stub blades 108B are depicted in FIG. 1 as all being directly attached to the ring shroud 106 and radially spaced from the hub 102. Alternatively, though not shown, the stub blades 108B could instead be directly attached to the hub 102 and radially spaced from the ring shroud 106. It is additionally contemplated that, for a particular propeller 100, some of the stub blades 108B could be directly attached to the hub 102 and others of the stub blades 108B could be directly attached to the ring shroud 106. One of ordinary skill in the art could determine a desired number, orientation, spacing, length(s), configuration, arrangement, or other physical properties of the motive blades 108 for a particular use environment.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. The propeller 100 could be used in any application or use environment wherein a fluid (e.g., liquid, gas, or any other material behaving in a fluid-like manner) interacts with a rotating structure (i.e., the propeller) to exchange (e.g., remove and/or provide) energy and/or motive power between the two. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application—e.g., certain of the stub blades 108B could be longer or shorter than others of the stub blades 108B. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A propeller, comprising:
   a hub coaxially surrounding a longitudinal axis;
   a ring shroud coaxially surrounding the longitudinal axis and spaced radially from the hub;
   at least one propeller blade fixedly attached to both the hub and ring shroud and extending radially therebetween for mutual rotation therewith, each propeller blade being angled in a first twist direction; and
   at least one stub blade having a first stub end radially spaced from a second stub end, the first stub end being fixedly attached to a selected one of the hub and ring shroud, and the second stub end being cantilevered from the first stub end and radially interposed between the first stub end and the selected one of the hub and ring shroud, each stub blade being angled in a second twist direction which is substantially opposite the first twist direction.

2. The propeller of claim 1, including a plurality of propeller blades and a plurality of stub blades, the propeller blades being circumferentially spaced about a perimeter of the hub, and each circumferentially adjacent pair of propeller blades having at least one stub blade interposed circumferentially therebetween.

3. A propeller, comprising:
   a hub coaxially surrounding a longitudinal axis;
   a ring shroud coaxially surrounding the longitudinal axis and spaced radially from the hub; and
   a plurality of motive blades extending radially across at least a portion of the distance between the hub and the ring shroud, each motive blade having a blade root directly attached to a chosen one of the hub and the ring shroud, for rotation about the longitudinal axis due to the attachment to the chosen one of the hub and the ring shroud, and a blade tip extending toward the other one of the hub and the ring shroud, at least one selected motive blade of the plurality of motive blades being angled in a first twist direction, and at least one other motive blade of the plurality of motive blades being angled in a second twist direction which is substantially opposite the first twist direction;
   wherein at least one selected blade tip is directly attached to the other one of the hub and the ring shroud; and
   wherein at least one other blade tip is cantilevered from the blade root and is radially spaced apart from the other one of the hub and the ring shroud.

4. The propeller of claim 3, wherein at least one motive blade having a blade tip directly attached to the other one of the hub and the ring shroud is directly circumferentially adjacent to at least one motive blade having a blade tip cantilevered from the blade root and radially spaced apart from the other one of the hub and the ring shroud.

5. The propeller of claim 3, wherein at least one motive blade of the plurality of motive blades which is angled in the first twist direction is directly circumferentially adjacent to at least one motive blade of the plurality of motive blades which is angled in the second twist direction.

6. An aircraft comprising:
   a body;
   at least one fixed wing and at least one propeller mount extending from the body;
   at least one drive shaft positioned within a corresponding one of the at least one propeller mount and drivable by a motor or gear/clutch system; and
   at least one propeller operationally attached to the at least one drive shaft to obtain motive power therefrom, the propeller comprising
      a hub coaxially surrounding a longitudinal axis,
      a ring shroud coaxially surrounding the longitudinal axis and spaced radially from the hub, and
      a plurality of motive blades extending radially across at least a portion of the distance between the hub and the ring shroud, each motive blade having a blade root directly attached to a chosen one of the hub and the ring shroud, for rotation about the longitudinal axis, under motive power from the drive shaft, due to the attachment to the chosen one of the hub and the ring shroud, and a blade tip extending toward the other one of the hub and the ring shroud, at least one selected motive blade of the plurality of motive blades being angled in a first twist direction, and at least one other motive blade of the plurality of motive blades being angled in a second twist direction which is substantially opposite the first twist direction,
   wherein at least one selected blade tip is directly attached to the other one of the hub and the ring shroud, and
   wherein at least one other blade tip is cantilevered from the blade root and is radially spaced apart from the other one of the hub and the ring shroud.

* * * * *